US010733872B2

(12) United States Patent
Ragland et al.

(10) Patent No.: US 10,733,872 B2
(45) Date of Patent: Aug. 4, 2020

(54) SYSTEMS AND METHODS FOR PREVENTING REMOTE DISARMING OF A PORTION OF A MONITORED REGION

(71) Applicant: Ademco Inc., Golden Valley, MN (US)

(72) Inventors: Amy Ragland, Sun City, AZ (US); Ilan Dee, Westbury, NY (US); Alice DeBiasio, Smithtown, NY (US)

(73) Assignee: ADEMCO INC., Golden Valley, MN (US)

( * ) Notice: Subject to any disclaimer, the term of this patent is extended or adjusted under 35 U.S.C. 154(b) by 0 days.

(21) Appl. No.: 16/288,774

(22) Filed: Feb. 28, 2019

(65) Prior Publication Data
US 2019/0272730 A1 Sep. 5, 2019

Related U.S. Application Data

(60) Provisional application No. 62/638,644, filed on Mar. 5, 2018.

(51) Int. Cl.
*G08B 23/00* (2006.01)
*G08B 25/00* (2006.01)
(Continued)

(52) U.S. Cl.
CPC ......... *G08B 25/008* (2013.01); *G06F 3/0482* (2013.01); *G08B 27/005* (2013.01);
(Continued)

(58) Field of Classification Search
CPC .... G08B 25/008; G08B 27/005; G08B 29/16; G08B 29/18; G06F 3/0482; H04L 67/025; H04L 67/125
See application file for complete search history.

(56) References Cited

U.S. PATENT DOCUMENTS 7,734,906 B2 * 6/2010 Orlando ............... G08B 25/008
340/286.01
8,990,887 B2 * 3/2015 Kocsis .............. H04W 12/0609
726/2
(Continued)

FOREIGN PATENT DOCUMENTS

EP 1 970 871 A2 9/2008
EP 1970871 A2 * 9/2008 ......... G08B 13/1968

OTHER PUBLICATIONS

Extended European search report for corresponding EP patent application 19160920.5, dated Jul. 31, 2019.

*Primary Examiner* — Quang Pham
(74) *Attorney, Agent, or Firm* — Husch Blackwell LLP

(57) ABSTRACT

Systems and methods for preventing remote disarming of a portion of a monitored region are provided. Such systems and methods can include a database device saving information designating at least one of a plurality of partitions monitored by a security system as a highly secure one of the plurality of partitions, a remote interface device receiving user input with instructions to execute a remote global action in connection with the security system, and responsive to the user input, the remote interface device accessing the database device to identify a group of the plurality of partitions that includes all of the plurality of partitions except for the highly secure one of the plurality of partitions and transmitting an instruction signal directing the security system to execute the remote global action in connection with each of the group of the plurality of partitions.

18 Claims, 4 Drawing Sheets

(51) Int. Cl.
*G06F 3/0482* (2013.01)
*G08B 27/00* (2006.01)
*G08B 29/16* (2006.01)
*H04L 29/08* (2006.01)
*G08B 29/18* (2006.01)

(52) U.S. Cl.
CPC ............ *G08B 29/16* (2013.01); *G08B 29/18* (2013.01); *H04L 67/025* (2013.01); *H04L 67/125* (2013.01)

(56) References Cited

U.S. PATENT DOCUMENTS

| | | | |
|---|---|---|---|
| 2014/0337921 A1* | 11/2014 | Hanna, Jr. | H04L 63/0428 726/3 |
| 2015/0302674 A1* | 10/2015 | Kuruba | G07C 9/27 340/5.54 |
| 2016/0117913 A1* | 4/2016 | Sharma | G08B 25/14 340/506 |
| 2016/0286033 A1* | 9/2016 | Frenz | H04M 1/72572 |
| 2016/0313750 A1* | 10/2016 | Frenz | H04L 12/282 |
| 2016/0323548 A1* | 11/2016 | Khot | G06F 3/04842 |
| 2016/0335423 A1* | 11/2016 | Beals | G06F 21/31 |
| 2018/0102045 A1* | 4/2018 | Simon | G08B 25/08 |
| 2018/0137725 A1* | 5/2018 | Acera | G08B 13/19684 |
| 2018/0160260 A1* | 6/2018 | Meganathan | H04L 67/125 |

\* cited by examiner

SYSTEMS AND METHODS FOR PREVENTING REMOTE DISARMING OF A PORTION OF A MONITORED REGION

CROSS REFERENCE TO RELATED APPLICATIONS

This application claims priority to U.S. Provisional Patent Application No. 62/638,644 filed Mar. 5, 2018 and titled "SYSTEMS AND METHODS FOR PREVENTING REMOTE DISARMING OF A PORTION OF A MONITORED REGION." U.S. Provisional Patent Application No. 62/638,644 is hereby incorporated by reference.

FIELD

The present invention relates generally to security systems. More particularly, the present invention relates to systems and methods for preventing remote disarming of a portion of a monitored region.

BACKGROUND

A security system may monitor a region that includes a plurality of partitions, and a user of the security system may want to designate at least one of the plurality of partitions as a highly secure one of the plurality of partitions, for example, a gun vault or a server room that should be armed at all times. For ease of use, a remote interface device or an application running on the remote interface device may allow the user to select all of the plurality of partitions and execute a global action, such as remotely disarming each of the plurality of partitions. However, when such a global action is executed, the highly secure one of the plurality of partitions may be disarmed along with other ones of the plurality of partitions.

In view of the above, there is a continuing, ongoing need for improved systems and methods for executing a global action in connection with a security system monitoring a region.

DETAILED DESCRIPTION

Figure 1:
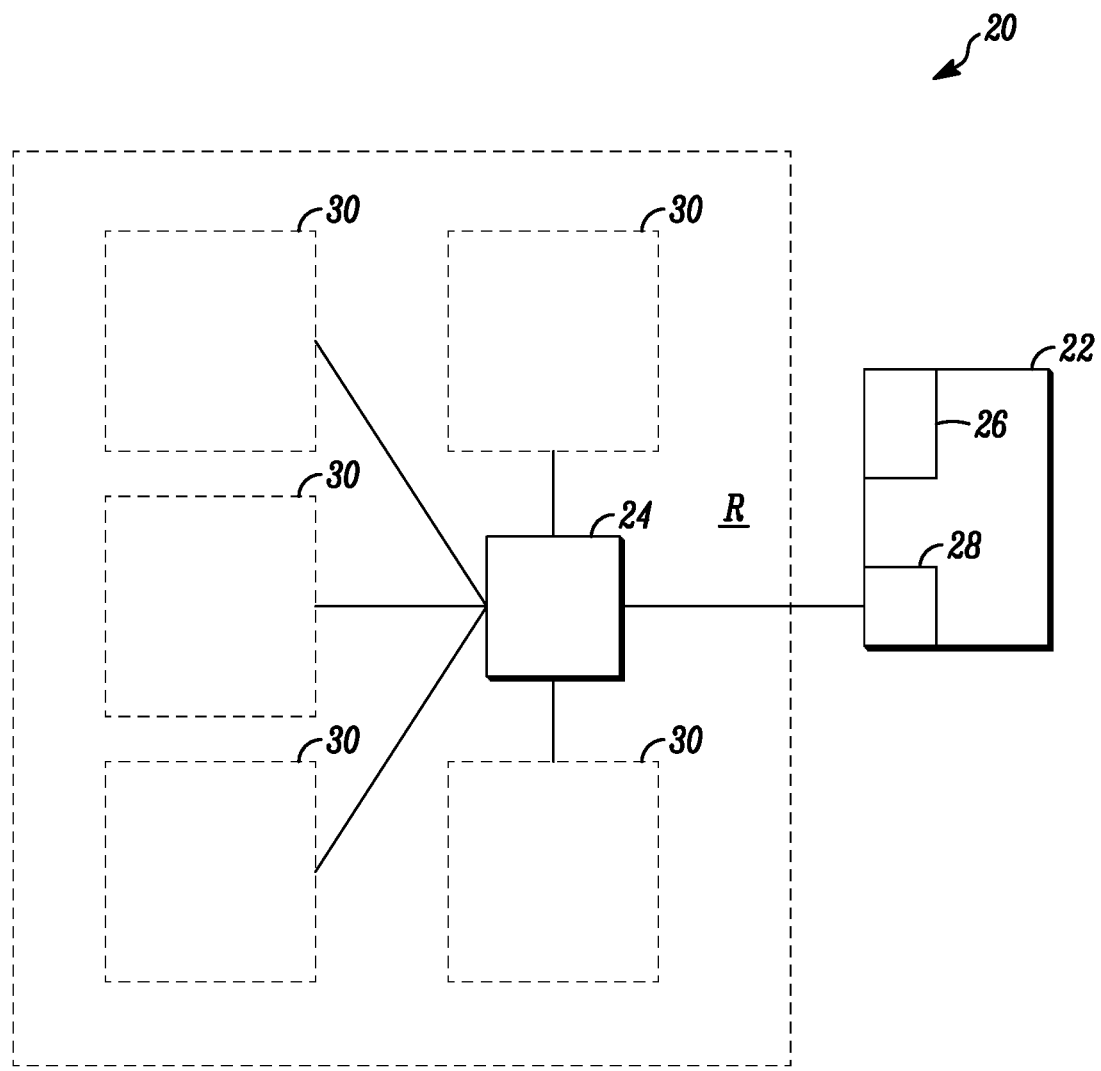
FIG. 1 is a block diagram of a system in accordance with disclosed embodiments.

While this invention is susceptible of an embodiment in many different forms, specific embodiments thereof will be described herein in detail with the understanding that the present disclosure is to be considered as an exemplification of the principles of the invention. It is not intended to limit the invention to the specific illustrated embodiments.

Embodiments disclosed herein can include systems and methods for preventing remote disarming of a portion of a monitored region protected by a security system. For example, the monitored region can include a plurality of partitions therein, each of the plurality of partitions can include a respective group of security devices that monitor a respective one of the plurality of partitions, and at least one of the plurality of partitions can be identified as a highly secure one of the plurality of partitions. In some embodiments, an installer or other master user of the security system can identify the at least one of the plurality of partitions as the highly secure one of the plurality of partitions, and a database device can store information designating the at least one of the plurality of partitions as the highly secure one of the plurality of partitions.

In operation, a remote interface device of the security system can receive user input with instructions to execute a remote global action, such as globally disarming each of the plurality of partitions. However, responsive thereto, systems and methods disclosed herein can refrain from executing the remote global action in connection with the highly secure one of the plurality of partitions, such as by transmitting an instruction signal for the remote global action that omits the highly secure one of the plurality of partitions from an identification of the plurality of partitions to disarm and/or by failing to transmit the instruction signal for the remote global action to the highly secure one of the plurality of partitions or to each of the respective group of security devices that monitors the highly secure one of the plurality of partitions. In this regard, systems and methods disclosed herein can provide a user with ease of use for remotely and globally disarming the plurality of partitions in the monitored region while giving the user peace of mind in knowing that the highly secure one of the plurality of partitions will remain armed regardless thereof.

For example, in some embodiments, responsive to receiving the user input with the instructions to execute the remote global action, the remote interface device can access the database device to identify the highly secure one of the plurality of partitions. Then, the remote interface device can identify a first group of the plurality of partitions that includes all of the plurality of partitions except for the highly secure one of the plurality of partitions. Finally, the remote interface device can transmit the instruction signal for the remote global action directing the security system to execute the remote global action in connection with each of the first group of the plurality of partitions or each of the respective group of security devices that monitors each of the first group of the plurality of partitions.

In some embodiments, the security system can include a control panel, and in these embodiments, the control panel can be physically located proximate to the monitored region and can receive the instruction signal for the remote global action from the remote interface device. Responsive to receiving the instruction signal for the remote global action, the control panel can execute the remote global action in connection with each of the first group of the plurality of partitions or each of the respective group of security devices that monitors each of the first group of the plurality of partitions. Additionally or alternatively, the control panel can transmit the instruction signal for the remote global action to each of the first group of the plurality of partitions or each of the respective group of security devices that monitors each of the first group of the plurality of partitions.

In some embodiments, the control panel can also receive user input with instructions to execute a local global action, and the local global action can be the same or different than the remote global action. In these embodiments, the control panel can execute the local global action in connection with a second group of the plurality of partitions that is identified by the installer or the master user of the security system instead of in connection with the first group of the plurality of partitions identified by the remote interface device. As such, systems and methods can process local global actions differently than remote global actions.

In some embodiments, the remote interface device can include a mobile device, such as a smart phone or a tablet, executing a mobile application or a web application thereon. Furthermore, in some embodiments, the remote interface device can communicate directly with the security system or the control panel of the security system. Additionally or alternatively, in some embodiments, the remote interface device can communicate with the security system or the control panel of the security system via a cloud server, and in these embodiments, the remote interface device can access the database device to identify the highly secure one of the plurality of partitions by instructing the cloud server to search the database device, identify the first group of the plurality of partitions, and transmit the instruction signal for the remote global action directing the security system to execute the remote global action in connection with each of the first group of the plurality of partitions or each of the respective group of security devices that monitors each of the first group of the plurality of partitions. In any embodiment, the database device can be part of the cloud server. Additionally, or alternatively, in some embodiments, the database device can be part of the control panel.

In some embodiments, the remote interface device can identify the first group of the plurality of partitions responsive to receiving the user input with the instructions to execute a first type of the remote global action, for example, globally disarming the security system. However, in some embodiments, the remote interface device can refrain from identifying the first group of the plurality of partitions responsive to receiving the user input with the instructions to execute a second type of the remote global action, for example, globally arming the security system. In these embodiments, responsive to receiving the user input with the instructions to execute the second type of the remote global action, the remote interface device can simply transmit the instruction signal for the remote global action to each of the plurality of partitions or to each of the respective group of security devices that monitors each of the plurality of partitions.

In some embodiments, when the at least one of the plurality of partitions is configured to be the highly secure one of the plurality of partitions, the remote interface device can disable an ability to select the highly secure one of the plurality of partitions, both individually and globally. For example, in some embodiments, the remote interface device can display an indicator, such as a closed lock icon, in connection with the highly secure one of the plurality of partitions to indicate that the highly secure one of the plurality of partitions is not available for selection, for example, when the highly secure one of the plurality of partitions has been locked in an armed state and cannot be remotely disarmed.

In some embodiments, systems and methods disclosed herein can require that user input to designate the highly secure one of the plurality of partitions is received locally at the control panel of the security system. Additionally or alternatively, in some embodiments, systems and methods disclosed herein can limit an ability to designate the highly secure one of the plurality of partitions to particular users, such as the installer, the master user, or another user designated by the installer or the master user. For example, in some embodiments, the control panel or the remote interface device can require valid authentication information for the installer or the master user to be received with the user input designating the highly secure one of the plurality of partitions. In these embodiments, when the authentication information is valid, the remote interface device or the control panel can designate the highly secure one of the plurality of partitions in the database device as such.

Systems and methods disclosed herein are described in connection with preventing the remote disarming of the highly secure one of the plurality of partitions in the monitored region. However, it is to be understood that systems and methods disclosed herein are not so limited and can be used in connection with preventing execution of any remote global action for any of the plurality of partitions in the monitored region or for any security devices associated therewith.

FIG. 1 is a block diagram of a security system 20 in accordance with disclosed embodiments. As seen in FIG. 1, the security system 20 can include a control panel 24, can monitor a region R that includes a plurality of partitions 30, and can communicate with a remote interface device 22 via a wide area network. The remote interface device 22 can include a transceiver 28, and in some embodiments, the remote interface device 22 can include a database device 26. Additionally or alternatively, in some embodiments, the database device 26 can be stored on a cloud server, and the remote interface device 22 can access the database device 26 via the wide area network.

Figure 2:
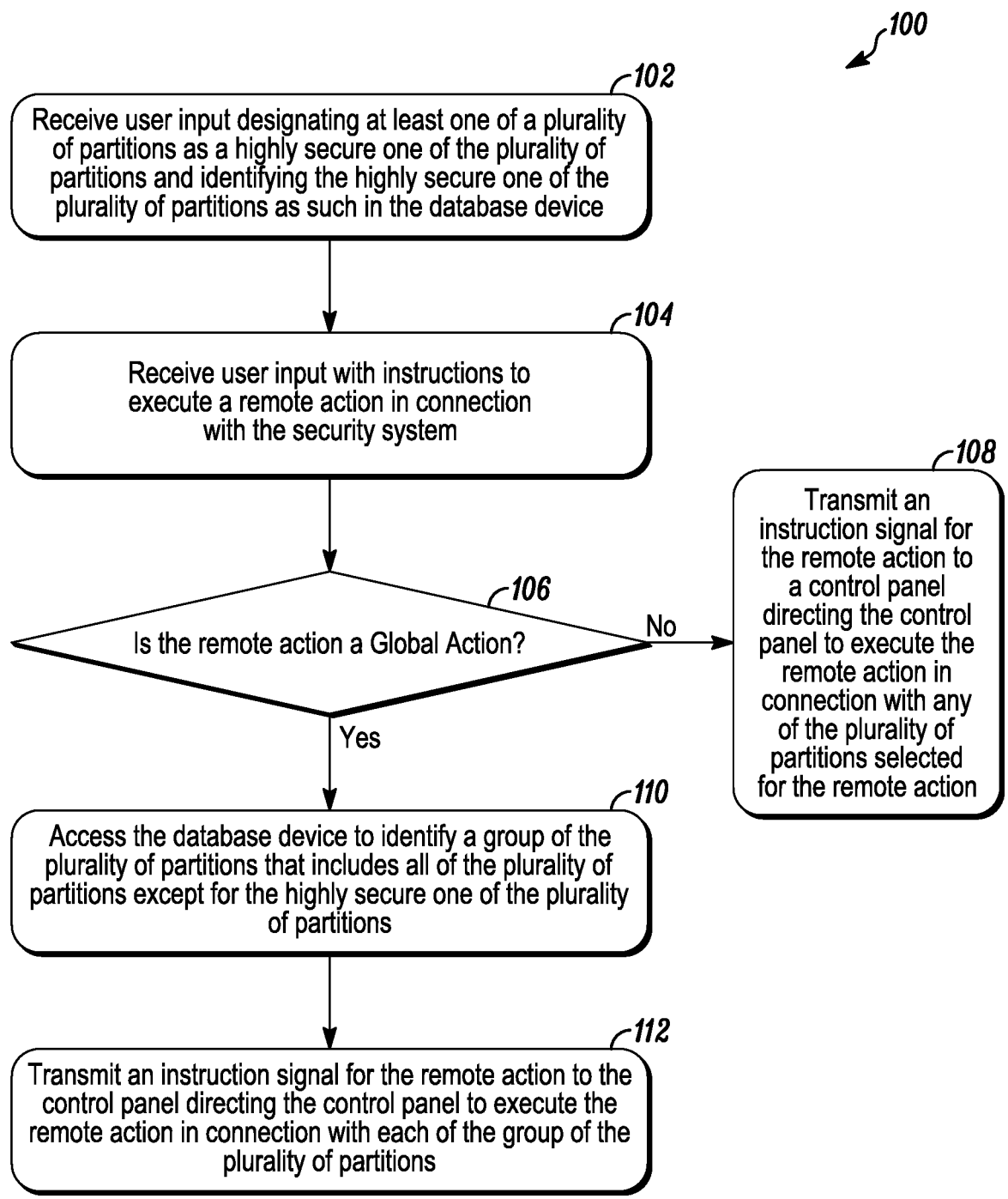
FIG. 2 is a flow diagram of a method in accordance with disclosed embodiments.

FIG. 2 is a flow diagram of a method 100 in accordance with disclosed embodiments. As seen in FIG. 2, the method 100 can include the control panel 24 or the remote interface device 22 receiving user input designating at least one of the plurality of partitions 30 as a highly secure one of the plurality of partitions and identifying the highly secure one of the plurality of partitions as such in the database device 26, as in 102. Then, the method 100 can include the remote interface device 22 receiving, via the transceiver 28, user input with instructions to execute a remote action in connection with the security system 20, as in 104.

Responsive to receiving the user input, the method 100 can include the remote interface device 22 determining whether the remote action is a global action, as in 106. If not, then the method 100 can include the remote interface device 22 transmitting ,via the transceiver 28, an instruction signal for the remote action to the control panel 24 directing the control panel 24 to execute the remote action in connection with any of the plurality of partitions selected for the remote action, as in 108.

However, when the remote action is the global action, the method 100 can include the remote interface device 22 accessing the database device 26 to identify a group of the plurality of partitions 30 that includes all of the plurality of partitions 30 except for the highly secure one of the plurality of partitions 30, as in 110, and the remote interface device 22 transmitting, via the transceiver 28, an instruction signal for the remote action to the control panel 24 directing the control panel 24 to execute the remote action in connection with each of the group of the plurality of partitions 30, as in 112.

Figure 3:
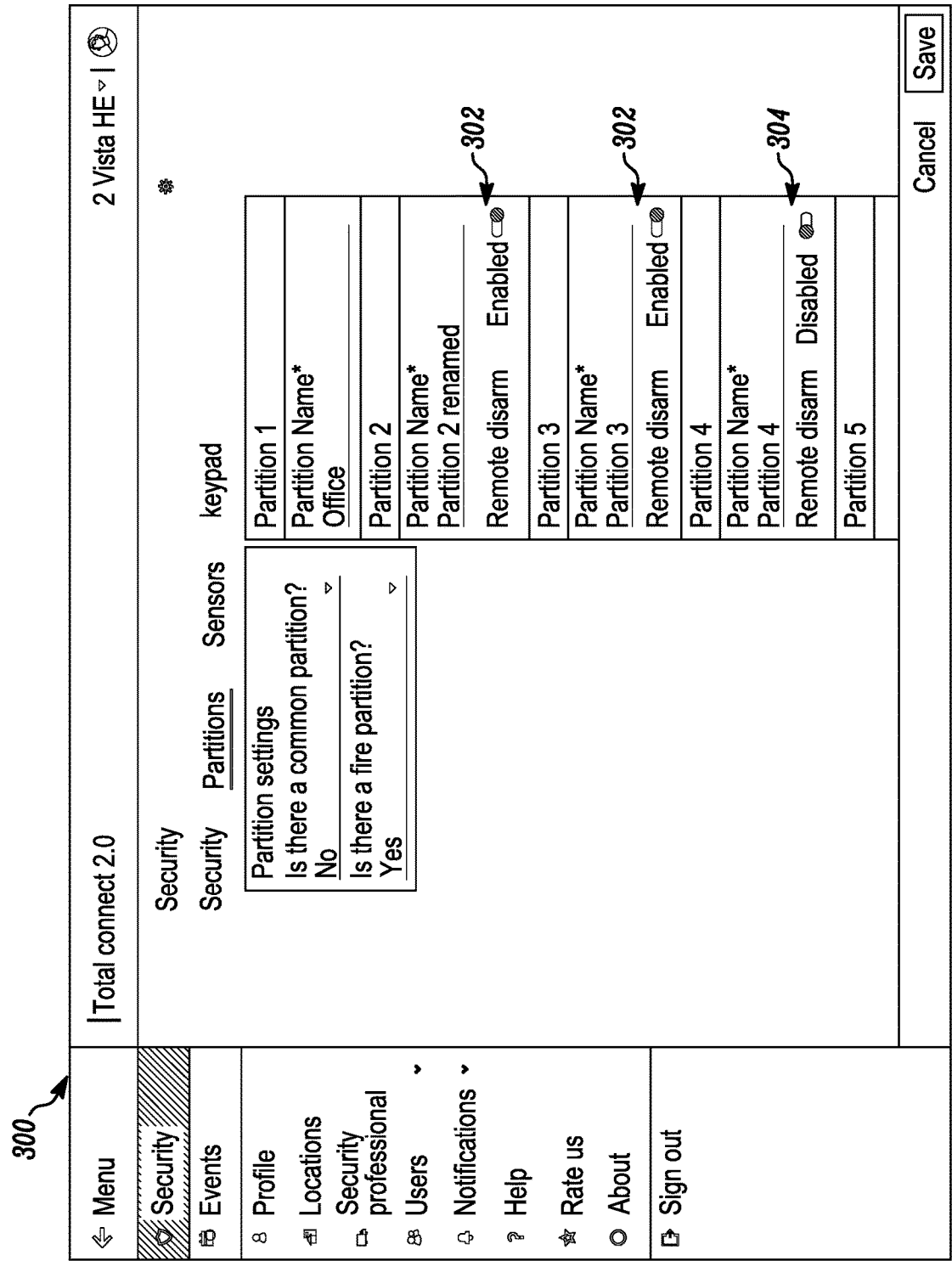
FIG. 3 is a view of a user interface of a security system for receiving user input to enable or disable a plurality of partitions in a monitored region.

FIG. 3 is a view of a user interface 300 of the control panel 24 or the remote interface device 22 for receiving user input to enable or disable remotely disarming the plurality of partitions 30. For example, as seen in FIG. 3, responsive to user input, the user interface 300 can display indications of Partition 2 and Partition 3 of the plurality of partitions 30 being enabled for remote disarming, as at 302, but Partition 4 of the plurality of partitions 30 being disabled for remote disarming, as at 304, such as when Partition 4 is a highly secure one of the partitions 30.

Figure 4:
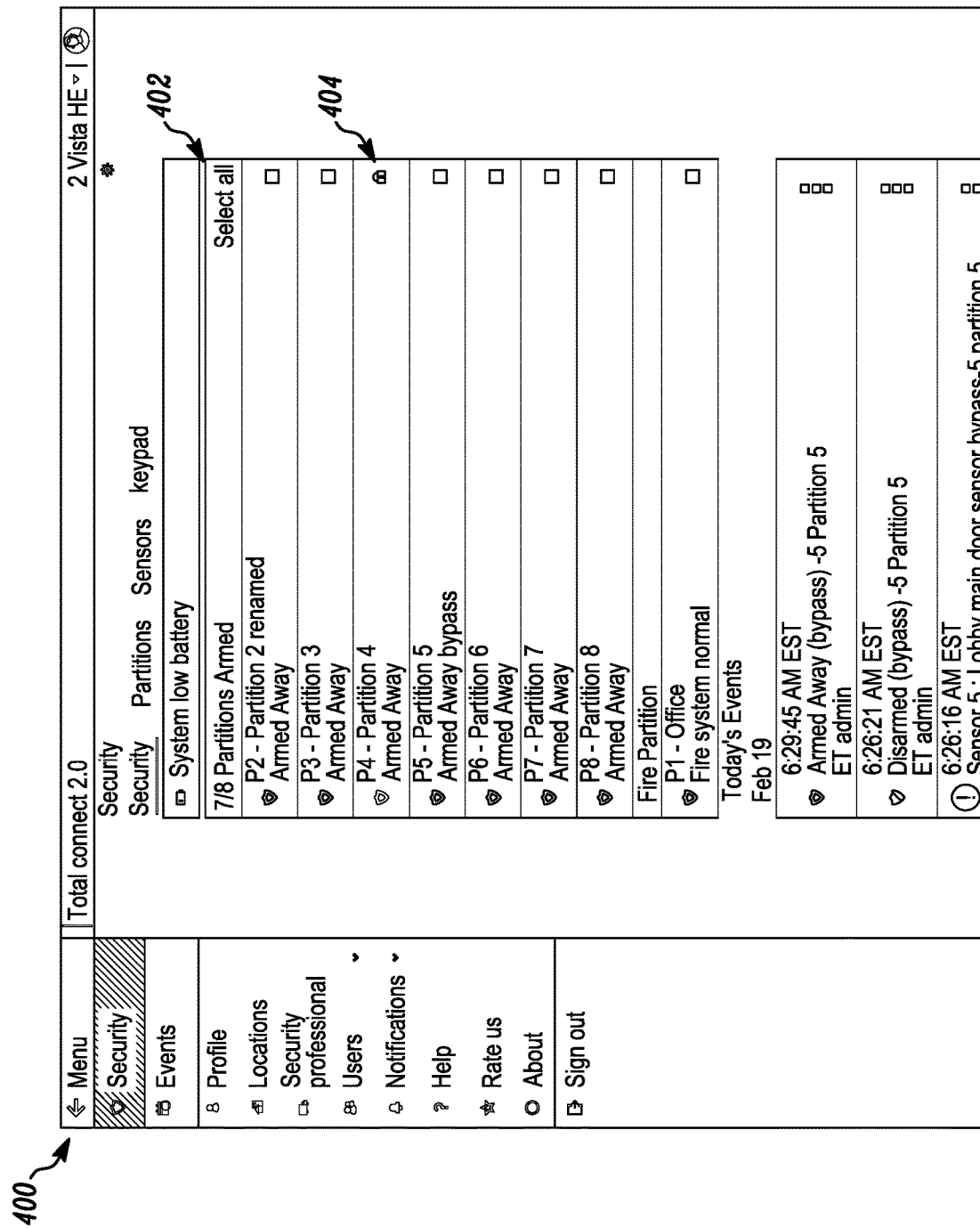
FIG. 4 is a view of a user interface of a security system displaying a respective checkbox associated with each of a plurality of partitions to receive or display user input for disarming a respective one of the plurality of partitions.

FIG. 4 is a view of a user interface 400 of the control panel 24 or the remote interface device 22 for displaying a respective checkbox associated with each of the plurality of partitions 30 to receive or display user input for disarming a respective one of the plurality of partitions 30. As seen in FIG. 4, the user interface 400 can also include a link 402 for selecting all of the plurality of partitions 30 in connection with globally disarming the plurality of partitions 30. In some embodiments, the user interface 400 can include a quick action button that when activated initiates a global disarming function for a group of the plurality of partitions 30 that includes all of the plurality of partitions 30 except for any of the plurality of partitions 30 where remote disarming has been disabled, for example, Partition 4 that was selected via the user interface 300 in FIG. 3.

Furthermore, when selected individually or as a group, the respective checkbox associated with each of the plurality of partitions 30 can be filled with a checkmark or other indicator. However, as seen in FIG. 4, the user interface 400 can remove and fail to include any box or link thereon for receiving user input to disarm a selected one of the plurality of partitions 30, for example, Partition 4 that was selected via the user interface 300 in FIG. 3. Instead, an icon 404 associated with the selected one of the plurality of partitions can indicate that the selected one of the plurality of partitions 30 is not available for selection, for example, when the selected one of the plurality of partitions 30 has been locked in an armed state (armed away or armed stay) and cannot be remotely disarmed, even responsive to user input for remotely and globally disarming the plurality of partitions 30. In some embodiments, the remote interface device 22 can display a notification explaining why the selected one of the plurality of partitions 30 is not available for selection.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system comprising:
 a security system that monitors a secured area that includes a plurality of partitions;
 a control panel of the security system that is physically located proximate to the secured area; and
 a remote interface device of the security system,
 wherein at least one of the plurality of partitions is designated as a highly secure one of the plurality of partitions in a database device,
 wherein, when the remote interface device receives first user input with instructions to remotely execute a global action in connection with the security system, the remote interface device accesses the database device to identify a first group of the plurality of partitions previously associated with the global action, automatically use the first group of the plurality of partitions to create a second group of the plurality of partitions that excludes the highly secure one of the plurality of partitions when the highly secure one of the plurality of partitions is included in the first group of the plurality of partitions, and transmit a first instruction signal for the global action to the control panel directing the control panel to execute the global action in connection with each of the second group of the plurality of partitions,
 wherein, when the control panel receives the first instruction signal from the remote interface device, the control panel executes the global action in connection with each of the second group of the plurality of partitions or transmits the first instruction signal to each of the second group of the plurality of partitions or to security devices that monitor each of the second group of the plurality of partitions, and
 wherein, when the control panel receives second user input directly at the control panel with instructions to locally execute the global action, the control panel executes the global action in connection with each of the first group of the plurality of partitions.

2. The system of claim 1 wherein the global action includes disarming, and wherein the first group of the plurality of partitions includes each of the plurality of partitions.

3. The system of claim 1 wherein, when the global action includes arming each of the plurality of partitions, the remote interface device refrains from using the first group of the plurality of partitions to create the second group of the plurality of partitions and transmits a second instruction signal for the global action to the control panel directing the control panel to execute the global action in connection with each of the first group of the plurality of partitions.

4. The system of claim 1 wherein the remote interface device includes a mobile device executing one of a mobile application or a web application thereon.

5. The system of claim 1 wherein the remote interface device communicates directly with the control panel.

6. The system of claim 1 wherein the remote interface device communicates with the control panel via a cloud server.

7. The system of claim 6 wherein the database device is part of the cloud server.

8. The system of claim 7 wherein the cloud server searches the database device and identifies the first group of the plurality of partitions.

9. A method for controlling a security system, the method comprising:
 saving information from an electronic device in a database device, the information designating at least one of a plurality of partitions monitored by a security system as a highly secure one of the plurality of partitions;
 receiving a first user input at a remote interface device with instructions to remotely execute a global action in connection with the security system;
 responsive to the first user input, accessing the database device from the remote interface device to identify a first group of the plurality of partitions previously associated with the global action, automatically use the first group of the plurality of partitions to create a second group of the plurality of partitions that excludes the highly secure one of the plurality of partitions when the highly secure one of the plurality of partitions is included in the first group of the plurality of partitions, and transmit a first instruction signal for the global action from the remote interface device to a control panel of the security system that is physically located proximate to the secured area, the first instruction signal directing the control panel to execute the global action in connection with each of the second group of the plurality of partitions;

receiving the first instruction signal from the remote interface device at the control panel;

responsive to the first instruction signal, executing the global action at the control panel in connection with each of the second group of the plurality of partitions or transmitting the first instruction signal from the control panel to each of the second group of the plurality of partitions or to security devices that monitor each of the second group of the plurality of partitions;

receiving a second user input directly at the control panel with instructions to locally execute the global action; and responsive to the second user input, executing the global action at the control panel in connection with each of the first group of the plurality of partitions.

10. The system of claim 9 wherein the global action includes disarming, and wherein the first group of the plurality of partitions includes each of the plurality of partitions.

11. The method of claim 9 further comprising:

when the global action includes arming each of the plurality of partitions, refraining from using the first group of the plurality of partitions to create the second group of the plurality of partitions; and responsive to the first user input, transmitting a second instruction signal for the global action from the remote interface device to the control panel directing the control panel to execute the global action in connection with each of the first group of the plurality of partitions.

12. The method of claim 9 wherein the remote interface device includes a mobile device executing one of a mobile application or a web application thereon.

13. The method of claim 9 further comprising:

communicating directly between the remote interface device and the control panel.

14. The method of claim 9 further comprising:

communicating between the remote interface device and the control panel via a cloud server.

15. The method of claim 14 wherein the database device is part of the cloud server.

16. The method of claim 15 further comprising:

searching the database device on the cloud server from the remote interface device to identify the first group of the plurality of partitions.

17. The method of claim 9 wherein the electronic device includes the remote interface device.

18. The method of claim 9 wherein the electronic device includes the control panel.

* * * * *